Figure 1:
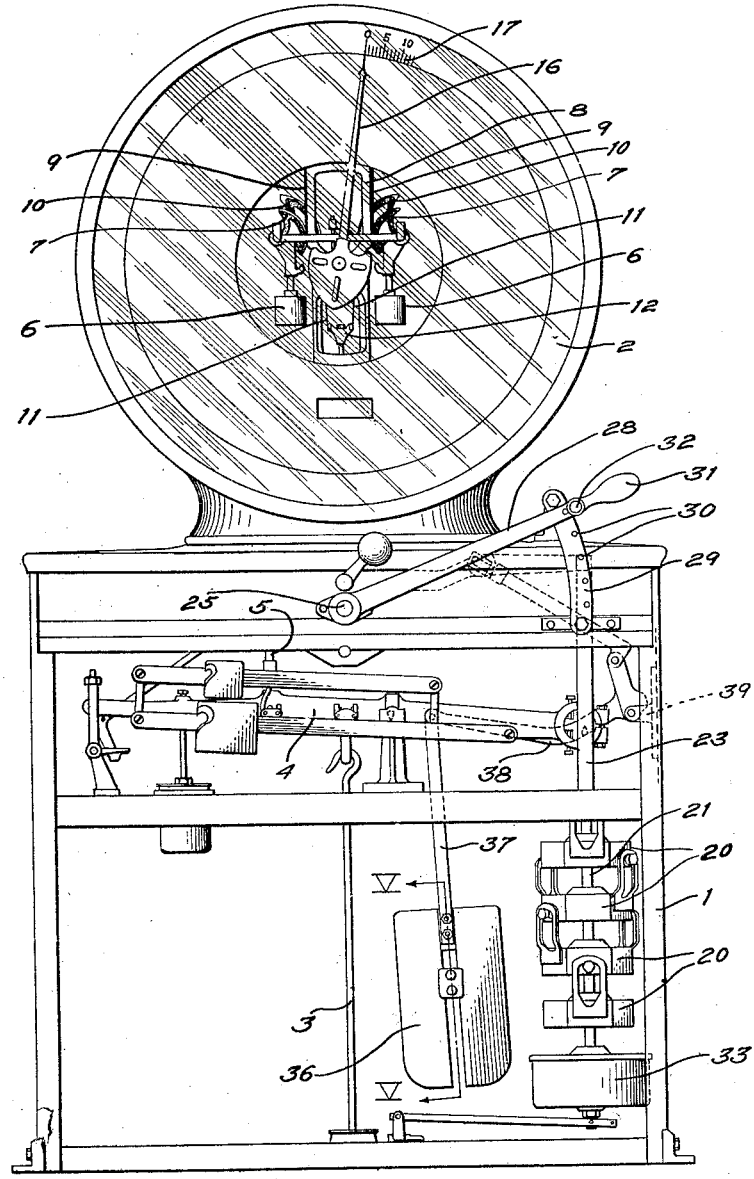

Nov. 29, 1927.

H. O. HEM

WEIGHING SCALE

Filed Oct. 24, 1924

1,651,274

2 Sheets-Sheet 1

Inventor
HALVOR O. HEM.
By C. O. Marshall
Attorney

Nov. 29, 1927.
H. O. HEM
WEIGHING SCALE
Filed Oct. 24, 1924
1,651,274
2 Sheets-Sheet 2
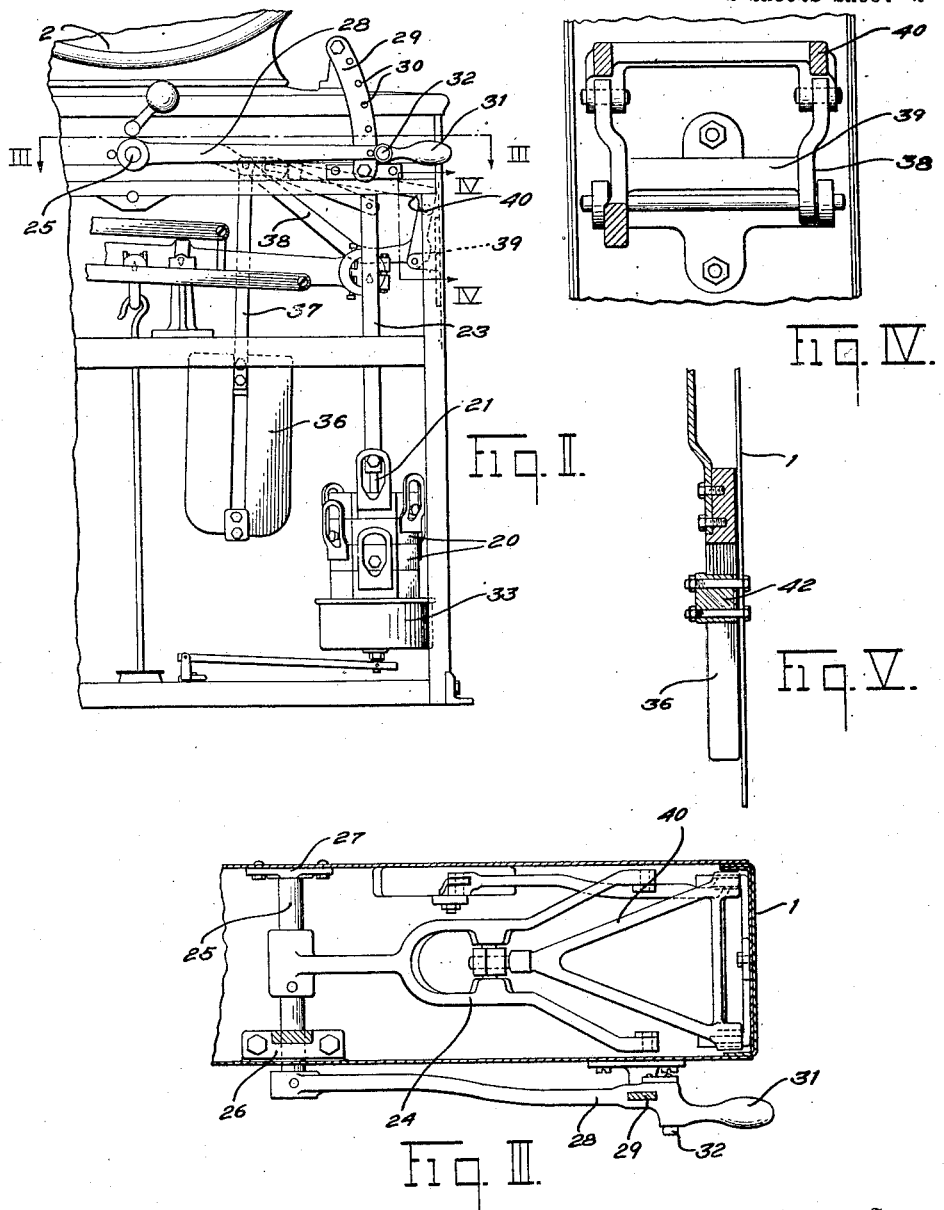
Inventor
Halvor O. Hem.
By C. M. Marshall
Attorney Patented Nov. 29, 1927.

1,651,274

UNITED STATES PATENT OFFICE.

HALVOR C. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed October 24, 1924. Serial No. 745,590.

This invention relates to weighing scales, and more particularly to counterbalancing devices for the unit counterpoise weights employed in certain types of scales for increasing the weighing capacity.

It is the usual practice for those engaged in the manufacture of weighing scales to provide a means for adding counterpoise weights to the lever mechanism of a scale for the purpose of increasing the weighing capacity. As these weights are successively brought into active engagement with the lever mechanism, the force required to move the weights varies inversely with the number of weights in engagement with the lever mechanism. It is one of the principal objects of this invention to provide counterbalancing mechanism for the unit weights, the effective counterbalancing force of this means varying with the number of weights supported upon it so that the force required to operate such mechanism will be substantially uniform.

Another object of the invention is the provision of a counterpoise weight counterbalancing means which will be positive in its operation, inexpensive to manufacture, and easy to assemble.

Still another object is the provision of a simple means for operating a unit weight capacity increasing device in which the only force required to operate the mechanism is substantially that necessary to overcome the friction of the moving parts.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale embodying my invention, parts of the housing being removed to show the arrangement of parts;

Figure II is a fragmentary front elevational view of a portion of the scale showing the unit counterpoise weight and counterbalancing device in a different position;

Figure III is a fragmentary sectional plan view taken substantially on the line III—III of Figure II;

Figure IV is an enlarged fragmentary vertical sectional view taken substantially on the line IV—IV of Figure II; and Figure V is an enlarged fragmentary sectional view taken on the line V—V of Figure I showing one element of my invention.

Referring to the drawings in detail, I have shown my invention as embodied in a scale of the so-called dormant cabinet type, but it is to be understood that my device may be incorporated in any mechanism to which it may be found applicable.

The scale proper consists of a platform, platform supporting levers and base (not shown), and erected upon the base is a housing or casing 1 which encloses the lever mechanism. Surmounting the upper portion of the housing 1 is a watch-case-shaped housing 2 within which is supported the automatic load-counterbalancing mechanism. The platform supporting mechanism is connected by means of a link 3 to an intermediate lever 4 pivotally fulcrumed within the housing 1, the lever 4 being connected by means of the link 5 to the automatic load-counterbalancing mechanism. This mechanism comprises a pair of pendulums 6 provided with the fulcrum sectors 7 forming integral parts thereof, the sectors being suspended from a supporting frame 8 by means of flexible metallic ribbons 9. The pendulums are also provided with power sectors 10 which are suitably connected by means of metallic ribbons 11 to an equalizing yoke 12, the yoke being operatively connected to the lever 4. It will be apparent that if a load be placed upon the scale platform, the platform will be moved downwardly, thus exerting a downward force on the link 3, effecting a counter-clockwise movement of the lever 4 about its fulcrum and a downward movement of the yoke 12 and ribbons 11, the pendulums 6 being moved outwardly and upwardly to counterbalance the load upon the platform. The indicator hand 16 is moved by means of rack and pinion mechanism (not shown) to a position indicating the weight on a chart 17.

In order that the weighing capacity of the scale may be increased, I have provided a plurality of unit counterpoise weights 20 which may be consecutively applied to a rod 21 suspended from one end of the lever 4. These weights in normal or inoperative position are suspended one from the other, the uppermost weight of the series being suspended from a pair of parallel supporting bars 23. The upper extremities of the bars 23 are pivotally connected to the furcations of a Y-shaped arm 24 which is fixed to a transversely extending shaft 25, said shaft being suitably journaled in brackets 26 and 27 fixed to the front and rear walls of the housing 1. Fixed upon the shaft 25 exteriorly of the housing 1 is an operating arm 28 which co-operates with a sector 29 having a plurality of spaced perforations 30. The portion of the arm 28 in juxtaposition to the sector 29 is provided with a spring-pressed plunger or pin (not shown) normally engaging one of the perforations 30 of the sector, but which may be released by inward movement of a finger piece 32 and the arm 28 shifted at will.

As illustrated in Figure I, the counterpoise weights 20 are in an inoperative position—i. e., suspended from the bars 23. When it is desirable to increase the capacity of the scale, the handle 31 of the arm 28 is grasped by the operator, the catch pin released by inward movement of the plunger 32, and the arm moved downwardly to move the lowermost unit counterpoise weight into engagement with a disk 33 fixed to the lower extremity of a rod 21 which is suspended from the lever 4. The remainder of the unit weights are adapted to be deposited one upon the other and any number of unit weights may be brought into operation by positioning the pin carried by the arm 28 in registration with the proper perforation in the sector 29.

It will be apparent that if most of the unit weights are suspended from the bars 23, the force required to move them becomes comparatively great and that an adequate and simple counterbalancing means for the unit weights is necessary for ease of operation of the mechanism. To the furtherance of this end I have provided a counterbalancing means comprising a weight 36 fixedly secured to a bar 37, the upper extremity of the bar being pivotally connected to a bell crank lever 38. The bell crank lever is pivoted intermediate its ends to a bracket 39 fixed to the end wall of the housing 1, the short arm of the lever 38 being pivoted to the extremities of the furcations of a Y-shaped link 40, the other end of the link 40 being connected to the bight of the arm 24.

In the operation of the counterbalancing device, the weight 36 exerts its maximum counterbalancing force when the various elements assume the position illustrated in Figure I. If the arm 28 be released and moved downwardly to a position effecting a deposit of the lowermost unit weight of the series on the disk 33, the link 40 and arm 24 more nearly approach a straight line and the lifting or counterbalancing force of the weight 36 is materially decreased. With each successive deposit of a unit weight, the link 40 and arm 24 change their respective positions and effect a further decrease in the counterbalancing effect of the weight 36. The parts are so proportioned that an engagement or disengagement of a unit weight with the weighing mechanism results in a variation in the counter-balancing effect of the weight 36 substantially equal to the actual weight of the counterpoise unit weight. The weight 36 is provided with a slot which receives a guide member 42 fixed to the rear wall of the housing 1, this guide member serving to prevent undue oscillation of the weight 36 when it is moved by means of the arm 28.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including lever mechanism, a series of counterpoise weights suspended one from another and adapted to be successively deposited upon said lever mechanism, a counterweight for said counterpoise weights, and means connecting said counterweight and said counterpoise weights whereby the undeposited portion of said counterpoise weights is substantially counterbalanced by said counterweight.

2. In a device of the class described, in combination, weighing mechanism including lever mechanism, a series of counterpoise weights suspended one from another and adapted to be successively deposited upon said lever mechanism, a counterweight for said counterpoise weights, means connecting said counterweight and said counterpoise weights whereby the undeposited portion of said counterpoise weights is substantially counterbalanced by said counterweight, and means whereby said connecting means may be manually operated for depositing said counterpoise weights upon said lever mechanism and lifting said counterpoise weights therefrom.

3. In a device of the class described, in combination, weighing mechanism including a lever, a poise pan suspended therefrom, a series of unit weights suspended from each other, means supporting said series of weights above said poise pan, a counterweight for said unit weights, and means connecting said counterweight to said unit weight supporting means, the arrangement being such that said counterweight substantially balances the undeposited portion of said unit weights.

4. In a device of the class described, in combination, weighing mechanism, a series of unit weights suspended one from another and adapted to be successively deposited upon said weighing mechanism, lever mechanism whereby said unit weights may be manually deposited upon and lifted from said lever mechanism, a counterweight for said unit weights, the construction and arrangement being such that said manually operable lever mechanism with said unit weights and said counterweight is in substantial balance in every operative position.

HALVOR O. HEM.